United States Patent Office 3,341,564
Patented Sept. 12, 1967

3,341,564
PROCESS FOR CONVERTING PRIMARY AMINES TO ISOTHIOCYANATES
Jon S. Potts, Hamden, Adnan A. R. Sayigh, North Haven, and Henri Ulrich, Northford, Conn., assignors to The Upjohn Company, Kalamazoo, Mich., a corporation of Delaware
No Drawing. Filed Feb. 13, 1964, Ser. No. 344,549
14 Claims. (Cl. 260—454)

ABSTRACT OF THE DISCLOSURE

A process of converting a primary amine of $pK_b$ greater than 9.4 to the corresponding isothiocyanate by reacting the primary amine at 50° C. to 150° C. with a thiocarbamoyl halide

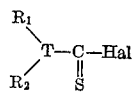

wherein Hal is chlorine or bromine and $R_1$ and $R_2$ represent alkyl or, taken with attached N atom, a heterocyclic radical.

---

This invention relates to the preparation of isothiocyanates. More particularly, it relates to the preparation of isothiocyanates which are difficult to prepare and which have hitherto required relatively inaccessible, expensive and/or toxic reagents.

A number of methods of making isothiocyanates are known. For example, Dieckmann et al., Ber., 40, 3737 (1907), describe the reaction of a primary amine with thiophosgene to give the corresponding isothiocyanate. While this method is applicable to the preparation of a variety of isothiocyanates, it requires the use of the toxic, volatile and expensive thiophosgene.

Campbell et al., J. Appl. Polymer Sci., 2 81 1959), prepare isothiocyanates by reacting a primary amine with $CS_2$ and ammonium hydroxide to obtain the corresponding ammonium dithiocarbamate which forms the corresponding isothiocyanate upon treatment with a mercuric or lead salt. It is further known to react an ammonium dithiocarbamate with phosgene to produce the corresponding isothiocyanate. These methods, while producing satisfactory results in some instances, are of limited scope, being unsatisfactory where the $NH_2$ group to be transformed to the NCS group is weakly basic.

Methods of making isothiocyanates from thioureas are also known. In Beilstein, fourth edition, 12, 453, the formation of phenyl isothiocyanate by heating N,N-diphenylthiourea with hydrochloric acid is shown. Such a method suffers the disadvantages that it frequently gives low yields of the desired product and depends upon the availability of the thiourea; thioureas are frequently made from the isothiocyanates. In many cases the appropriate thiourea is not readily available particularly where the parent primary amine is very weakly basic, the method suffering limitations similar to those based on the use of a dithiocarbamic acid salt. Further, these processes require more than one step.

In contrast, the process of the present invention is of general applicability as a single step process for the conversion of a compound containing a weakly basic primary amino group, as hereinafter defined, to the corresponding isothiocyanate, and is free from the disadvantages of the prior art processes. The term "weakly basic" as it is employed to describe amino groups and amines in this specification and claims means an amino group having a $pK_b$ of greater than about 9.4.

It is an objective of this invention to provide a method for converting amino groups, wherein the amino groups are weakly basic as hereinbefore defined, to isothiocyanato groups. A further objective is to convert aromatic amines to the corresponding aryl isothiocyanates. A more particular objective is to provide a convenient, simple method for converting primary aromatic amines, having an electron-withdrawing group in a position electron-withdrawing with respect to the amino group, to the corresponding isothiocyanato compound. The term aromatic is used in a sense familiar to those acquainted with the art. For example, as described by Royals, Advanced Organic Chemistry, Prentice-Hall, Englewood Cliffs, N.J., 1956, chapter 5. Further objects will become apparent from the detailed description given hereinafter.

The process of the present invention, in its broadest aspect, comprises reacting a compound containing at least one primary amino group having a $pK_b$ of greater than 9.4 with a thiocarbamoyl halide having the formula:

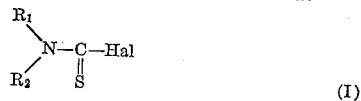

(I)

wherein Hal represents halogen and

is the residue of an organic secondary amine having a $pK_b$ of less than 5.0, whereby said primary amino group is converted to isothiocyanato.

The process of the invention is carried out conveniently by bringing the reactants together in the presence of an inert organic solvent at an elevated temperature. Advantageously the reaction temperature is of the order of from about 50° C. to about 150° C. and preferably the reaction is conducted at a temperature of from about 80° C. to about 100° C. The reaction time varies from the order of minutes to the order of hours according to the particular reactants and reaction conditions employed.

In carrying out the process of the invention the thiocarbamoyl halide (I) is preferably employed in approximately stoichiometric proportion with respect to the primary amino compound. The thiocarbamoyl halide can be employed in excess of stoichiometric proportions if desired but the use of an excess gives no significant advantage in yield or ease of reaction.

The process of the invention proceeds according to the following reaction scheme:

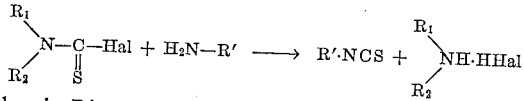

wherein R' represents the residue of the starting organic compound having a primary amino group and $R_1$, $R_2$ and Hal are as hereinbefore defined.

The desired isothiocyanate is isolated from the reaction mixture by conventional procedures. For example, the amine hydrohalide formed in the reaction is generally insoluble in the reaction solvent and can be removed by filtration, centrifugation, or the like and the filtrate so obtained is evaporated to yield the desired isothiocyanate. The latter can then be purified, if desired, by conventional procedures, for example, by distillation in the case of liquids or by recrystallization in the case of solids.

The inert organic solvent employed in the process of the invention can be any organic solvent which does not enter into reaction with either of the reactants or in any other way interfere with the process of the invention. Illustrative of inert solvents which can be employed are aliphatic hydrocarbons such as pentane, hexane, heptane, octane, and the like; aromatic hydrocarbons such as benzene, toluene, xylene, and the like; chlorinated aliphatic hydrocarbons such as chloroform, carbon tetrachloride, methylene chloride, ethylene dichloride, and the like; chlorinated aromatic hydrocarbons such as chlorobenzene, dichlorobenzene, trichlorobenzene, chlorotoluenes, chloroxylenes, and the like; nitro substituted aromatic hydrocarbons such as nitrobenzene, o-nitrotoluene, m-dinitrobenzene, 4-nitro-m-xylene, and the like; and nitro substituted aliphatic hydrocarbons such as nitromethane, nitroethane, nitropropane, and the like. The preferred solvents for use in the process of the invention are the aromatic hydrocarbons and their nitro and halogen substituted derivatives as exemplified above.

The thiocarbamoyl halides (I) which are employed in the process of the invention are those wherein the residue

is that of a strongly basic secondary amine, i.e., one having a $pK_b$ of less than 5.0. While the thiocarbamoyl halide (I) can be derived from any secondary amine having a $pK_b$ within the above range, it is preferred to use a thiocarbamoyl halide (I) wherein the groups $R_1$ and $R_2$ taken individually represent lower-alkyl or the groups $R_1$ and $R_2$ taken together with the attached nitrogen atom represent a saturated heterocyclic radical having from 5 to 7 atoms in the ring. The term "lower-alkyl" means alkyl containing from 1 to 8 carbon atoms, inclusive, such as methyl, ethyl, propyl, butyl, pentyl, hexyl, heptyl, octyl, and isomeric forms thereof. The term "saturated heterocyclic radical having 5 to 7 carbon atoms in the ring" is inclusive of pyrrolidino, lower-alkylpyrrolidino such as 2-methylpyrrolidino, 2,2-dimethylpyrrolidino, 3-methylpyrrolidino, and the like, piperazino, lower-alkylpiperazino such as 2-methylpiperazino, 4-methylpiperazino, 2,4-dimethylpiperazino, and the like, 4-(chlorothioformyl)piperazino, piperidino, lower-alkylpiperidino such as 2-methylpiperidino, 3-methylpiperidino, 4,4-dimethylpiperidino, and the like, morpholino, hexamethyleneimino, homopiperazino, homomorpholino, and the like.

Illustrative of amino compounds having a $pK_b$ of greater than 9.4 which can be converted to the corresponding isothiocyanates according to the process of the invention are:

Aromatic amines such as aniline, o-nitroaniline, m-nitroaniline, p-nitroaniline, o,p-dinitroaniline, p-aminobenzoic acid, m-aminobenzoic acid, anthranilic acid, ethyl p-aminobenzoate, methyl p-aminobenzoate, propyl m-aminobenzoate, isopropyl anthranilate, hexyl p-aminobenzoate, octyl p-aminobenzoate, p-chloroaniline, m-chloroaniline, o,p-dichloroaniline, p-bromoaniline, m-bromoaniline, o,o',p-trichloroaniline, p-fluoroaniline, p-trifluoromethylaniline, m-trifluoromethylaniline, p-aminobenzamide, m-aminobenzamide, p-aminoacetophenone, m-aminopropiophenone, p-toluidine, m-toluidine, o-toluidine, 2-chloro-4-methylaniline, 1,2,3-xylidine, 1,2,4-xylidine, 1,3,2-xylidine, p-methylsulfonylaniline, m-methylsulfonylaniline, p-methylthioaniline, m-methylthioaniline, m-trimethylsilylaniline, p-trimethylsilylaniline, p-methoxyaniline, p-ethoxyaniline (phenetidine), p-propoxyaniline, o-butoxyaniline, p-octyloxyaniline, α-naphthylamine, β-naphthylamine, 4-nitro-α-naphthylamine, 3-nitro-β-naphthylamine, 4-chloro-α-naphthylamine, 3-bromo-β-naphthylamine, 8-ethoxy-α-naphthylamine, 4-methyl-α-naphthylamine, 6-propyl-β-naphthylamine, o-phenylenediamine, o,o'-dichlorobenzidine, 4,4'-methylenedianiline, and the like;

Amino acids such as glycine, alanine, creatinine, leucine, valine, norleucine, isoleucine, ornithine, lysine, arginine, phenylalanine, and the like;

Urea and derivatives thereof such as thiourea, semicarbazide, biuret, and the like;

Sulfonamides for example, alkane sulfonamides, such as methanesulfonamide, ethanesulfonamide, propanesulfonamide, 2-propanesulfonamide, 3-butanesulfonamide, hexanesulfonamide, octanesulfonamide, and the like; aromatic sulfonamides such as benzenesulfonamide, p-toluenesulfonamide, m-xylenesulfonamide, 1-naphthalenesulfonamide, 2-naphthalenesulfonamide, p-phenylbenzenesulfonamide, and the like, and aralkylsulfonamides such as phenylmethanesulfonamide, 2-phenylethanesulfonamide, 2-phenylpropanesulfonamide, 4-phenylbutanesulfonamide, and the like.

While the process of the invention is of general applicability to the conversion of weakly basic amino compounds, as hereinbefore defined, to the corresponding isothiocyanates, it is of particular value in the conversion of aromatic amines having a $pK_b$ of greater than about 9.4 to the corresponding isothiocyanates. In particular, the process of the invention is of value in the conversion of aromatic primary amines, having an electron-withdrawing group in the aromatic nucleus, to the corresponding isothiocyanates. The term "electron-withdrawing group" is well-recognized in the art [see, for example, Organic Chemistry, D. J. Cram and G. S. Hammond, McGraw-Hill, 1959, p. 170] and is inclusive of quaternary amino, nitro, nitrato, cyano, carboxyl, carbalkoxy, N,N-dihydrocarbylcarboxamido, halo, acyl, nitroso, trifluoromethyl and the like. The introduction of one or more of said electron-withdrawing groups into the aromatic nucleus of a primary aromatic amine causes a decrease in basicity, i.e., an increase in $pK_b$ of the said amine. The effect is greatest, i.e., the resulting decrease in basicity is most marked, when the electron-withdrawing group is introduced in a position ortho or para to the amino group in the aromatic nucleus. The effect on basicity is less marked when the electron-withdrawing group is introduced in the position meta to the amino group in the aromatic nucleus of the primary amine.

The isothiocyanates which are obtained by the process of the invention are for the most part known compounds. However, certain classes of isothiocyanates produced by the process of the invention are novel. In particular the isothiocyanates produced by subjecting alkylsulfonamides, aralkylsulfonamides, and arylsulfonamides to the process of the invention are novel compounds. These isothiocyanates can be characterized by the general formula R—SO₂NCS wherein R represents alkyl such as methyl, ethyl, propyl, butyl, pentyl, hexyl and isomeric forms thereof, aralkyl such as benzyl, phenethyl, 2-phenylpropyl, benzhydryl, and the like, aryl such as phenyl, tolyl, xylyl, naphthyl, biphenylyl and the like and alkyl, aralkyl, and aryl radicals which are substituted by inert groups, i.e. groups which are inert under the conditions of the reaction of this invention such as halo, nitro, acyl, carboxyl, carbalkoxy, cyano, trifluoromethyl and the like.

The isothiocyanates of the formula RSO₂NCS wherein R is as defined above are useful as intermediates. Illustratively, they can be reacted with ammonia or a primary amine, for example, according to the procedure described by Suter et al. J. Amer. Chem. Soc. 55, 2497, 1933 for the reaction of isothiocyanates with ammonia and amines, to yield the corresponding sulfonyl thioureas. The latter compounds are active as bactericidal and antidiabetic agents and are also useful as intermediates, by reaction with acid halides such as phosgene, phosphorus pentachloride, phosphorus pentabromide, thionyl chloride, and the like, in the preparation of the corresponding sulfonylcarbodiimides. The latter compounds are useful as antidiabetic agents and as stabilizers for polyesters. Polyesters tend to deteriorate under heat and high humidity conditions as well as simple ageing of the product. The sulfonylcarbodiimides obtained as described above can be used to stabilize polyesters against these undesirable characteristics using the procedures set forth in, for example, German Patent 1,005,726 for the stabilization of polyesters using carbodiimides.

The other isothiocyanates produced by the process of the invention, many of which isothiocyanates are already known, are also useful in a variety of ways. Illustratively, many of the isothiocyanates can be employed as fungicides, for example as described in British Patent 810,044, and for this purpose they can be formulated in ways conventional in the art to produce dusting powders, dispersible powder, aqueous dispersions and emulsions, and aerosols. The isothiocyanates are also useful as intermediates in chemical synthesis. For example they can be reacted with ammonia and primary amines, as described above, to yield the corresponding thioureas which are, in many cases, known compounds of established usefulness. Illustratively, N-arylthioureas, for example N,N'-diphenylthiourea prepared from phenyl isothiocyanate and aniline, are useful as stabilizing agents (against ageing and exposure to heat and ultraviolet light) for reaction products of high molecular polyunsaturated compounds (natural and synthetic rubbers) and sulphur dioxide, in accordance with U.S. Patent 2,583,370. The N-arylthioureas produced as described above are also useful as metal (copper) discoloration inhibitors in polyphosphate containing detergents in accordance with U.S. Patent 2,698,302. The N,N'-diarylthioureas which can be obtained as described above are useful in the preparation of flotation agents in accordance with British Patent 546,232.

The thiocarbamoyl halides (I), which are employed in the process of the invention, can be prepared by conventional procedures, for example by reaction of the corresponding secondary amine

wherein $R_1$ and $R_2$ have the significance hereinbefore defined, with thiophosgene or with bromothiophosgene using the procedure described by, for example, Billeter, Berichte 26, 1686 (1893).

The following examples illustrate the best mode contemplated by the inventors for carrying out their invention but are not to be construed as limiting the scope thereof.

*Example 1.—p-Nitrophenyl isothiocyanate*

A mixture of p-nitroaniline (13.8 g.; 0.100 mole), N,N-diethylthiocarbamoyl chloride (90%) (16.6 g.; 0.099 mole) and 300 ml. of benzene was prepared at room temperature and slowly heated to reflux with stirring. Heating at reflux and stirring were continued for one hour. At the end of this time the mixture was cooled, filtered and the filtrate concentrated under reduced pressure to yield 17.9 grams, a nearly quantitative yield, of p-nitrophenyl isothiocyanate. The material so obtained was recrystallized from acetone to yield 10.8 grams (60% of theory) of p-nitrophenyl isothiocyanate as a pale orange-yellow solid melting at 102–105° C.

A similar procedure wherein toluene was used at reflux in place of benzene gave equally good results.

Using the procedure described above, but replacing p-nitroaniline by o-nitroaniline there was obtained o-nitrophenyl isothiocyanate in quantitative crude yield. Recrystallization from acetone gave o-nitrophenyl isothiocyanate, melting at 67–70° C.

*Example 2.—Ethyl p-isothiocyanatobenzoate*

A mixture of ethyl p-aminobenzoate (16.5 g.; 0.100 mole), N,N-diethylthiocarbamoyl chloride (90% pure) (16.8 g.; 0.100 mole), and 200 ml. of toluene was prepared at room temperature and then heated with stirring at reflux for two hours. The resulting mixture was cooled and filtered to remove 10.7 g. of diethylamine hydrochloride. The toluene filtrate was concentrated at reduced pressure to give 22.4 g. (79.5% theory) of ethyl p-isothiocyanatobenzoate as a white, crystalline solid, melting at 51–53° C., and boiling at 123–127° C./0.1 mm.

*Analysis.*—Calcd. for $C_{10}H_9NO_2S$: N, 6.76. Found: N, 7.10.

*Example 3.—4,4'-methylenebis(phenyl isothiocyanate)*

A mixture of 4,4'-methylenedianiline (19.8 g.; 0.100 mole), N,N-diethylthiocarbamoyl chloride (90%) (33.6 g.; 0.200 mole), and 250 ml. of toluene was prepared at room temperature then heated at reflux with stirring for one hour. The mixture so obtained was cooled and filtered and the toluene filtrate was concentrated at reduced pressure to give 22.8 g. (81% theory) of crude 4,4'-methylenebis(phenyl isothiocyanate).

Recrystallization from alcohol gave 4,4'-methylenebis(phenyl isothiocyanate) as nearly white needles. The product was identified by its infrared absorption spectrum which shows a strong absorption band characteristic of the isothiocyanate at 4.8μ.

*Example 4.—p-Isothiocyanatobenzoic acid*

Using the procedure described in Example 1, but replacing p-nitroaniline by p-aminobenzoic acid, there is obtained p-isothiocyanatobenzoic acid.

Similarly, using the procedure described in Example 1, but replacing p-nitroaniline by o,p-dinitroaniline, propyl m-aminobenzoate, isopropyl anthranilate, p-chloroaniline, o,p-dichloroaniline, p-bromoaniline, p-fluoroaniline, m-trifluoromethylaniline, p-aminoacetophenone, m-toluidine, 2-chloro-4-methylaniline, p-methylsulfonylaniline, m-methylthioaniline, m-trimethylsilylaniline, phenetidine, α-naphthylamine, β-naphthylamine, o-phenylenediamine, and o,o'-dichlorobenzidine, there are obtained o,p-dinitrophenyl isothiocyanate, propyl m-isothiocyanatobenzoate, isopropyl o-isothiocyanatobenzoate, p-chlorophenyl isothiocyanate, o,p-dichlorophenyl isothiocyanate, p-bromophenyl isothiocyanate, p-fluorophenyl isothiocyanate, m-trifluoromethylphenyl isothiocyanate, p-isothiocyanatoacetophenone, m-tolyl isothiocyanate, 2-chloro-4-methylphenyl isothiocyanate, p-methylsulfonylphenyl isothiocyanate, m-methylthiophenyl isothiocyanate, m-trimethylsilylphenyl isothiocyanate, p-ethoxyphenyl isothiocyanate, α-naphthyl isothiocyanate, β-naphthyl isothiocyanate, o-phenylene diisothiocyanate, and o,o'-dichloro-p,p'-diisothiocyanatodiphenyl, respectively.

*Example 5.—Isothiocyanatoacetic acid*

Using the procedure described in Example 1, but replacing p-nitroaniline by glycine, there is obtained isothiocyanatoacetic acid.

Similarly, using the procedure described in Example 1, but replacing p-nitroaniline by alanine, leucine, phenylalanine, or lysine, there are obtained 2-isothiocyanatopropanoic acid, 2-isothiocyanato-4-methylpentanoic acid, 2-isothiocyanato-3-phenylpropanoic acid, and 2,6-diisothiocyanatohexanoic acid, respectively.

*Example 6.—Carbamyl isothiocyanate*

Using the procedure described in Example 1, but replacing p-nitroaniline by urea, there is obtained carbamyl isothiocyanate.

Similarly, using the procedure described in Example 1, but replacing p-nitroaniline by thiourea, semicarbazide or biuret, there are obtained thiocarbamyl isothiocyanate, 1-isothiocyanatourea, and allophanoyl isothiocyanate, respectively.

*Example 7.—Methanesulfonyl isothiocyanate*

Using the procedure described in Example 1, but replacing p-nitroaniline by methanesulfonamide, there is obtained methanesulfonyl isothiocyanate.

Similarly, using the procedure described in Example 1, but replacing p-nitroaniline by ethanesulfonamide, propanesulfonamide, 2-propanesulfonamide, 3-butanesulfonamide, or hexanesulfonamide, there are obtained ethanesulfonyl isothiocyanate, propanesulfonyl isothiocyanate, 2-propanesulfonyl isothiocyanate, 3-butanesulfonyl isothiocyanate, and hexanesulfonyl isothiocyanate, respectively.

Example 8.—p-Tosyl isothiocyanate

Using the procedure described in Example 1, but replacing p-nitroaniline by p-toluenesulfonamide, there is obtained p-tosyl isothiocyanate.

Similarly, using the procedure described in Example 1, but replacing p-nitroaniline by benzenesulfonamide, m-xylenesulfonamide, 2 - naphthalenesulfonamide, phenylmethanesulfonamide, or 2-phenylethanesulfonamide, there are obtained benzenesulfonylisothiocyanate, m-xylenesulfonylisothiocyanate, 2-naphthalenesulfonylisothiocyanate, phenylmethanesulfonylisothiocyanate and 2-phenylethanesulfonylisothiocyanate, respectively.

Example 9

Using the procedure described in Example 1, but replacing N,N-diethylthiocarbamoyl dichloride by N,N-dimethyldithiocarbamoyl chloride there is obtained p-nitrophenyl isothiocyanate.

Similarly, using the procedure described in Example 1, but replacing N,N-diethylthiocarbamoyl chloride by N,N-diisopropylthiocarbamoyl bromide, N,N - dibutylthiocarbamoyl chloride, N,N-diisopentylthiocarbamoyl chloride, N,N-dihexylthiocarbamoyl bromide, 1-chlorothioformylpyrrolidine, 1-chlorothioformyl-2-methylpyrrolidine, 1-bromothioformylpiperazine, 1,4-bis(chlorothioformyl)piperazine, 1 - chlorothioformyl - 4 - methylpiperazine, 1-bromothioformylpiperidine, 1-chlorothioformyl - 2 - methylpiperidine, 1-chlorothioformylmorpholine, 1-chlorothioformylhexamethyleneimine, 1 - chlorothioformylhomopiperazine, 1,4-bis(bromothioformyl)homopiperazine, and 1-chlorothioformylhomomorpholine, there is obtained p-nitrophenyl isothiocyanate.

We claim:
1. The process which comprises reacting at a temperature within the range of about 50° C. to about 150° C. a compound containing a primary amino group having a pK$_b$ of greater than 9.4 with a thiocarbamoyl halide having the formula:

$$\begin{array}{c} R_1 \\ \phantom{R}\diagdown \\ \phantom{R_1R_2}N-C-Hal \\ \phantom{R}\diagup \phantom{NC}\| \\ R_2 \phantom{N-C}S \end{array}$$

wherein Hal represents a member selected from the group consisting of chlorine and bromine, R$_1$ and R$_2$ taken individually represent lower-alkyl, and R$_1$ and R$_2$ taken together with the attached nitrogen atom represents a saturated heterocyclic radical having from 5 to 7 atoms in the ring, whereby said primary amino group is converted to isothiocyanato.

2. A process for the preparation of an aryl isothiocyanate which comprises reacting at a temperature within the range of about 50° C. to about 150° C. a primary aromatic amine having a pK$_b$ of greater than 9.4 with a thiocarbamoyl halide having the formula:

$$\begin{array}{c} R_1 \\ \phantom{R}\diagdown \\ \phantom{R_1R_2}N-C-Hal \\ \phantom{R}\diagup \phantom{NC}\| \\ R_2 \phantom{N-C}S \end{array}$$

wherein Hal is a member selected from the group consisting of chlorine and bromine, R$_1$ and R$_2$ taken individually represent lower-alkyl, and R$_1$ and R$_2$ taken together with the attached nitrogen atom represent a saturated heterocyclic radical having from 5 to 7 atoms in the ring, whereby the primary amino group of said primary aromatic amine is converted to isothiocyanato.

3. The process of claim 2 wherein the thiocarbamoyl halide is an N,N-di(lower-alkyl)thiocarbamoyl halide.

4. A process for the preparation of an aryl isothiocyanate having an electron-withdrawing group in at least one of the positions in the aromatic ring ortho and para to the isothiocyanate group, which comprises reacting at a temperature within the range of about 50° C. to about 150° C. a primary aryl amine, having an electron-withdrawing group in at least one of the positions in the aromatic ring ortho and para to the amino group, with a thiocarbamyl halide having the formula:

$$\begin{array}{c} R_1 \\ \phantom{R}\diagdown \\ \phantom{R_1R_2}N-C-Hal \\ \phantom{R}\diagup \phantom{NC}\| \\ R_2 \phantom{N-C}S \end{array}$$

wherein Hal is a member selected from the group consisting of chlorine and bromine, R$_1$ and R$_2$ taken individually represent lower-alkyl and R$_1$ and R$_2$ taken together with the attached nitrogen atom represent a saturated heterocyclic radical having from 5 to 7 atoms in the ring.

5. A process for the preparation of a phenylisothiocyanate having the formula:

$$X-C_6H_4-NCS$$

wherein X represents at least one electron-withdrawing group which comprises reacting at a temperature within the range of about 50° C. to about 150° C. the corresponding amine having the formula:

$$X-C_6H_4-NH_2$$

wherein X has the significance hereinbefore defined with a thiocarbamoyl halide having the formula:

$$\begin{array}{c} R_1 \\ \phantom{R}\diagdown \\ \phantom{R_1R_2}N-C-Hal \\ \phantom{R}\diagup \phantom{NC}\| \\ R_2 \phantom{N-C}S \end{array}$$

wherein Hal is a member selected from the group consisting of chlorine and bromine, R$_1$ and R$_2$ taken individually represent lower-alkyl and R$_1$ and R$_2$ taken together with the attached nitrogen atom represent a saturated heterocyclic radical having from 5 to 7 atoms in the ring.

6. The process of claim 4 wherein the thiocarbamoyl halide is an N,N-di(lower-alkyl)thiocarbamoyl halide.

7. A process for the preparation of p-nitrophenyl isothiocyanate which comprises reacting at a temperature within the range of about 50° C. to about 150° C. p-nitroaniline with a thiocarbamoyl halide having the formula:

$$\begin{array}{c} R_1 \\ \phantom{R}\diagdown \\ \phantom{R_1R_2}N-C-Hal \\ \phantom{R}\diagup \phantom{NC}\| \\ R_2 \phantom{N-C}S \end{array}$$

wherein Hal is a member selected from the group consisting of chlorine and bromine, R$_1$ and R$_2$ taken individually represent lower-alkyl and R$_1$ and R$_2$ taken together with the attached nitrogen atom represent a saturated heterocyclic radical having from 5 to 7 atoms in the ring.

8. The process of claim 5 wherein the thiocarbamoyl halide is an N,N-di(lower-alkyl)thiocarbamoyl halide.

9. A process for the preparation of o-nitrophenyl isothiocyanate which comprises reacting at a temperature within the range of about 50° C. to about 150° C. o-nitroaniline with a thiocarbamoyl halide having the formula:

$$\begin{array}{c} R_1 \\ \phantom{R}\diagdown \\ \phantom{R_1R_2}N-C-Hal \\ \phantom{R}\diagup \phantom{NC}\| \\ R_2 \phantom{N-C}S \end{array}$$

wherein Hal is a member selected from the group consisting of chlorine and bromine, R$_1$ and R$_2$ taken individually represent lower-alkyl and R$_1$ and R$_2$ taken together with the attached nitrogen atom represent a saturated heterocyclic radical having from 5 to 7 atoms in the ring.

10. The process of claim 7 wherein the thiocarbamoyl halide is an N,N-di(lower-alkyl)thiocarbamoyl halide.

11. A process for the preparation of ethyl p-isothiocyanatobenzoate which comprises reacting at a temperature within the range of about 50° C. to about 150° C. ethyl p-aminobenzoate with a thiocarbamoyl halide having the formula:

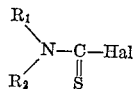

wherein Hal is a member selected from the group consisting of chlorine and bromine, $R_1$ and $R_2$ taken individually represent lower-alkyl and $R_1$ and $R_2$ taken together with the attached nitrogen atom represent a saturated heterocyclic radical having from 5 to 7 atoms in the ring.

12. The process of claim 9 wherein the thiocarbamoyl halide is an N,N-di(lower-alkyl)thiocarbamoyl halide.

13. A process for the preparation of 4,4'-methylene bis(phenyl isothiocyanate) which comprises reacting at a temperature within the range of about 50° C. to about 150° C. 4,4'-methylenedianiline with a thiocarbamoyl halide having the formula:

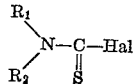

wherein Hal is a member selected from the group consisting of chlorine and bromine, $R_1$ and $R_2$ taken individually represent lower-alkyl and $R_1$ and $R_2$ taken together with the attached nitrogen atom represent a saturated heterocyclic radical having from 5 to 7 atoms in the ring.

14. The process of claim 11 wherein the thiocarbamoyl halide is an N,N-di(lower-alkyl)thiocarbamoyl halide.

References Cited

UNITED STATES PATENTS 2,755,285 7/1956 O'Neill et al. _____ 260—454 X
3,235,580 2/1966 Kuhle _____ 260—454

CHARLES B. PARKER, *Primary Examiner.*

D. H. TORRENCE, *Assistant Examiner.*